(No Model.)
H. D. COGSWELL.
SYSTEM OF AND APPARATUS FOR PRODUCING AND DISTRIBUTING REFRIGERATED AIR AND WATER.
No. 272,654. Patented Feb. 20, 1883.
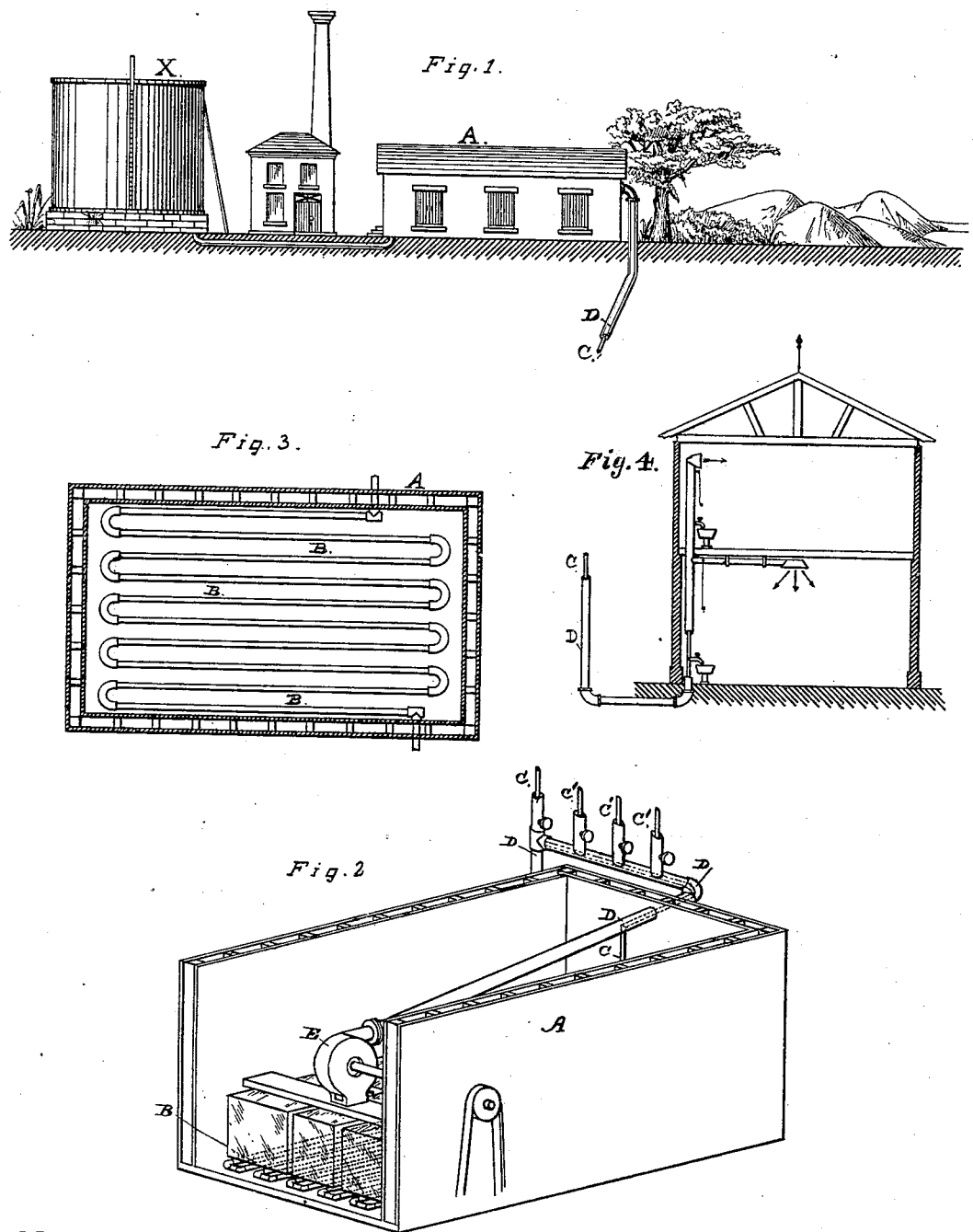

UNITED STATES PATENT OFFICE.

HENRY D. COGSWELL, OF SAN FRANCISCO, CALIFORNIA.

SYSTEM OF AND APPARATUS FOR PRODUCING AND DISTRIBUTING REFRIGERATED AIR AND WATER.

SPECIFICATION forming part of Letters Patent No. 272,654, dated February 20, 1883.

Application filed October 24, 1881. (No model.)

*To all whom it may concern:*

Be it known that I, HENRY D. COGSWELL, of the city and county of San Francisco, in the State of California, have made and invented a certain new and useful System of and Apparatus for Supplying Refrigerated Air and Water and for General Use; and I do hereby declare that the following is a full, clear, and exact description of my said invention, reference being had to the accompanying drawings.

My invention has reference to a method of producing cold air for cooling and ventilating purposes and cold water for drinking and refrigerating purposes upon a large scale, and in connection with the water-works of a city, town, or district, and in connection with such method a means of supplying the two products together to buildings or localities for use.

I combine with the water-mains or supply-pipes, either directly at the water-works or at stations located in sections or districts of suitable area for distribution of the products, an ice-house or refrigerating-chamber, into which the water-pipes are led and disposed in condition to be covered or surrounded by the refrigerant agent, and then leading out from such refrigerating-pipes a number or system of distributing-pipes to various points of supply. I also combine, with an ice-house or refrigerating-chamber so combined with the water-mains or supply-pipes of water-works, a system of air conduits or tubes and an air blowing or forcing apparatus to produce a flow of air under pressure from the refrigerating-chamber through the said air-tubes, the said water-distributing pipes being incased within and carried through the air-tubes, and the two conductors adapted to be led together to various points for supplying the cold air and cold water for general use.

The general object of my invention, as hereinafter fully described and set forth, is to provide an economical system of furnishing cold air and cold water for use in cities, towns, or districts, thereby greatly increasing the sanitary conditions in seasons of heat and contributing to the general comfort and welfare of the inhabitants.

Referring to the accompanying drawings, Figure 1 shows the general arrangement of my system of producing and supplying refrigerated air and water on a large scale for distribution. Fig. 2 shows the arrangement of the air and water refrigerating chamber and the conductors leading therefrom. Fig. 3 is a plan of this chamber, showing the grating of water-pipes. Fig. 4 is a section of a room, showing the arrangement of pipes for the distribution of the air and water.

A represents an ice house or chamber of required capacity. It may be either the ordinary storage-house—such as used in cities and places where ice is kept for the market—or it may be a chamber specially constructed in convenient position and relation to the section or district throughout which the cold water is to be distributed. By locating the usual ice-houses in convenient situation where the water-pipes of the general water-supply can be carried into them, I can utilize the cold from the bodies of ice stored in them and from the drippings and water that result from the melting in warm weather. Within this house or chamber, I then place and arrange a system of water-pipes, B, either in a coil or, as shown in Fig. 3 of the drawings, by carrying lengths of pipes connected by couplings back and forth to form a grate, so that the pipes or conductors from the reservoir or pumping-works X, Fig. 1, being connected with the grate B, the supply of water is caused to pass in a circuitous manner through the ice-chamber, and is thereby brought to a low degree of temperature before being distributed for use and consumption. The grate B is laid either directly upon the bottom of the chamber A, which will then be made water-tight, or in the form of a shallow trough or pan, to confine the water from the melting ice; or these lengths of pipes are supported in a position above the floor where they may be surrounded and covered by the ice, as may be most convenient and practical, and then the ice is laid in and packed around the pipes.

From the grate B, I lead one or more outlet-pipes, C, through the sides of the chamber, and then carry from it or divide it into as many branches C' C' as may be necessary to conduct the refrigerated water to points and localities for use. In this way I provide, in connection with the water-works or water-supply of a city, town, or district, a means of producing, in an economical manner and on a large scale, a supply of cold water for general use, both for drinking and for refrigerating purposes.

In connection and combination with the chamber A and the supply-pipes C', I also employ air tubes or conductors D D, which I carry out from the chamber, and then by means of a fan or air-forcing apparatus, E, I produce a flow of cold air through the tubes D, and by this means I supply air at a low temperature at the same time and lead it to any desired point for cooling and ventilating purposes. Each water-pipe C is incased by an air-tube, D, which is of a size to afford a space all around the inclosed water-pipe for the passage of the air, and the two together, forming a double conduction for air and water, are laid beneath the surface from the refrigerating-chamber A to the locality where they are to be applied, and then they are carried up into and through the buildings to be supplied with cold water, and to be cooled or ventilated by the cold air. When carried into the apartments or rooms of a building, the air tube is tapped, and a short pipe or branch from the water-pipe is led out through the tube D, wherever the cold water is required, while the air-tube is carried up the several stories and led off into branches or divisions where the cold air can be applied to the best advantage. These tubes are provided with valves or stop-cocks to regulate the amount of air-supply, as will be understood from the drawings, by which any part or branch can be shut off or the quantity increased or diminished at any point in the building. By using the double conductors in this manner the water-pipes are covered and protected by the surrounding body of refrigerated air, and the temperature of the water is kept down and prevented from being affected by the heat of the atmosphere with which the pipes may be in contact, while the air may derive a refrigerating action from the cold-water pipe around which it flows. This mode of reducing the temperature of the water-supply in cities and system of providing air at low temperature for general distribution with a cold-water supply is of great advantage.

Public buildings, theaters, hospitals, and manufactories can be supplied with cold water without the handling and use of ice, and also ventilated by the same apparatus without additional expense. Dwelling-houses and tenements can be rendered comfortable and healthful during seasons of heat in a most economical manner, and under conditions that do not require any expensive machinery or any outlay on the parts of the tenants.

In applying the system to the ventilation and cooling of sick-rooms and hospitals, a medicated atmosphere can be produced for the treatment of such diseases and complaints as would be benefited by such treatment, provision being made in connection with the outlets of the cold-air tube for passing the cold-air current through the medications, as will readily suggest itself to the physician.

I am aware that buildings—such as hotels—have been supplied with cool air and water from a single refrigerating-station, and I do not claim such.

Having thus fully described my invention, what I claim, and desire to secure by Letters Patent, is—

1. The method of producing cold air and distributing it herein set forth, consisting of forcing the air by means of a blower, after it is first refrigerated in a suitable refrigerating-building, through a tube surrounding an inner tube containing water similarly refrigerated, which incasing-tube follows the water-tube its entire distance, and discharges at the same locality as the water, whereby the air is moved with swiftness and absorbs the cold from the water-tube, while it protects the water from the influence of the external air, substantially as set forth.

2. As a means of producing and supplying air and water at a low temperature to buildings and tenements, the refrigerating room or chamber A, having the water coils or pipes B, which are connected with a suitable head or source of supply, the supply pipe or pipes C C leading therefrom, the air-conducting tubes D D, surrounding and incasing the distributing-pipes C C, and an air-blower or forcing apparatus for producing a flow of air from said refrigerating room or chamber through the said tubes, substantially as described, for the purposes set forth.

HENRY D. COGSWELL. [L. S.]

Witnesses:
  THOS. H. HOLT,
  ALFRED C. CRANE.